United States Patent
Willoughby et al.

(10) Patent No.: US 6,319,534 B1
(45) Date of Patent: Nov. 20, 2001

(54) EXPANDABLE FOOD PRODUCTS AND METHODS OF PREPARING SAME

(75) Inventors: Chris L. Willoughby; Terry L. Engle, both of Battle Creek, MI (US)

(73) Assignee: The Eggo Company, Battle Creek, MI (US)

( * ) Notice: Subject to any disclaimer, the term of this patent is extended or adjusted under 35 U.S.C. 154(b) by 0 days.

(21) Appl. No.: 09/653,103

(22) Filed: Aug. 31, 2000

Related U.S. Application Data

(63) Continuation of application No. 09/368,122, filed on Aug. 4, 1999, now Pat. No. 6,171,631, which is a continuation of application No. 09/189,447, filed on Nov. 10, 1998, now abandoned.

(60) Provisional application No. 60/065,847, filed on Nov. 14, 1997.

(51) Int. Cl.[7] .............................. A21D 13/00; A23B 4/03
(52) U.S. Cl. ...................... 426/559; 426/560; 426/448; 426/465; 426/473
(58) Field of Search .................................... 426/447, 448, 426/559

(56) References Cited

U.S. PATENT DOCUMENTS

| | | |
|---|---|---|
| 3,703,379 | 11/1972 | Cumisford et al. . |
| 3,800,050 | 3/1974 | Popel . |
| 3,904,429 | 9/1975 | Eastman et al. . |
| 3,978,244 | 8/1976 | Sair . |
| 4,179,527 | 12/1979 | White . |
| 4,209,537 | 6/1980 | Wood . |
| 4,271,206 | 6/1981 | Fariel et al. . |
| 4,289,794 | 9/1981 | Kleiner et al. . |
| 4,409,250 | 10/1983 | Van Hulle et al. . |
| 4,673,438 | 6/1987 | Wittwer et al. . |
| 4,734,289 | 3/1988 | Yamaguchi et al. ................. 426/302 |
| 4,961,937 | 10/1990 | Rudel . |
| 4,990,348 | 2/1991 | Spratt et al. . |
| 5,080,914 | 1/1992 | Birch et al. . |
| 5,093,146 | 3/1992 | Calandro et al. .................... 426/619 |
| 5,108,772 | 4/1992 | Wilbur . |
| 5,279,658 | 1/1994 | Aung . |
| 5,320,669 | 6/1994 | Lim et al. . |
| 5,378,418 | 1/1995 | Berger et al. . |
| 5,618,341 | 4/1997 | Andersen et al. . |

*Primary Examiner*—Nina Bhat
(74) *Attorney, Agent, or Firm*—Howard & Howard

(57) ABSTRACT

Disclosed is an expandable half-product comprising a starchy farinaceous material, wherein the starch molecules of the farinaceous material are unidirectionally aligned and form a matrix of randomly aligned starch molecules upon exposure to microwave radiation to form a puffed half-product having at least twice the dimensions of the unmicrowaved half-product. Methods of preparing the products are also disclosed.

20 Claims, No Drawings

EXPANDABLE FOOD PRODUCTS AND METHODS OF PREPARING SAME

This application is a continuation of U.S. application Ser. No. 09/368,122, filed Aug. 4, 1999, which is now U.S. Pat. No. 6,171,631, which is a continuation of U.S. application Ser. No. 09/189,447, filed Nov. 10, 1998, now abandoned, which claims the benefit of U.S. Provisional Application No. 60/065,847, filed Nov. 14, 1997.

TECHNICAL FIELD

The present invention relates to expandable food products prepared from starchy farinaceous compositions that puff upon exposure to microwave radiation. The invention also relates to methods of preparing the expandable products.

BACKGROUND OF THE INVENTION

Consumers are offered a large number of food products that have been prepared and/or treated in numerous ways for considerations such as convenience, storage, stability, and organoleptic considerations, e.g., taste or feel during mastication, and appearance. Food producers are continuously seeking ways to differentiate their products from others by means of coloring, flavoring, design and/or other characteristics.

It is highly desirable to produce a product that has a 3-dimensional shape to mimic, e.g. the shape of well known images or characters. It is also important, as mentioned above, that the products simultaneously have the requisite aesthetic properties, e.g. taste and mouthfeel. Such products are desirable because they provide excellent product recognition. Various three-dimensional confections and candies are commercially available.

For example, U.S. Pat. No. 5,108,772 discloses a puffable gellatinized dough pellets which pop upon microwave heating in a consumer microwave oven. The pellets include an outer methylcellulose skin or casing of sufficient tensile strength to allow buildup of internally generated steam pressure upon microwave heating. Upon sufficient buildup of steam pressure, the skin fails suddenly, allowing the pellet to puff explosively thereby simultaneously causing an audible popping sound. The pellets are prepared from starchy compositions such as cooked farinaceous dough or dehulled popcorn.

Molding processes have been used in the plastics industry to produce numerous products of varying size and shape. Such processes have also been used to make biodegradable articles from foodstuffs. For example, U.S. Pat. No. 5,320,669 to Lim et al. discloses a biodegradable thermoplastic composition made of cereal grain that is treated with an organic solvent to extract lipids that may undergo undesirable reactions during thermal processing of the composition. The cereal grain may further be treated with a cross-linking agent that binds the proteins and/or starches together such that the resultant product has improved water resistance compared to articles made without the cross-linking agent. The thermoplastic composition may then be formed, e.g. by injection molding, into an article of desired shape.

U.S. Pat. No. 5,279,658 to Aung discloses a composition said to be suitable for forming shaped articles, e.g. biodegradable packaging material, comprising a mixture of flour, starch, and water. The flour and starch maybe obtained from natural sources, e.g. cereal grains. The mixture heated and mixed under a sufficient pressure, temperature and moisture content and for a sufficient period of time that when the pressure is decreased the mixture expands to form a composition which is rigid when cooled and stable over a predetermined temperature. A shaped article, e.g. a may be formed from the composition by injecting the composition into a molding press and forming the composition into a shaped article.

Additional puffable food products and processes for preparing the food products are desirable. The present invention is directed to such products and processes.

SUMMARY OF THE INVENTION

The present invention relates to expandable ("puffable") food products prepared from starchy farinaceous compositions, e.g. farinaceous grains or grain products. The food products are preferably half-products, such as a cereal, snack or convenience food, that can be further processed by the consumer to their puffed form, e.g. by exposure to microwave radiation in a conventional microwave oven. Alternatively, the half-product may be heated in a conventional oven, e.g. 450° F. for about 20 minutes, to expand the half-product.

More particularly, the invention relates in part to expandable half-products comprising a starchy farinaceous composition having unidirectionally aligned starch molecules that are capable of forming a matrix of randomly aligned starch molecules upon exposure to microwave radiation. Preferably, the microwaved product expands to about twice the size of the unmicrowaved half-product, e.g. from about 2 to about 10 times the size of the unmicrowaved half-product.

The expandable half-products of the present invention can be prepared from a variety of starchy farinaceous compositions including natural or preprocessed farinaceous grain or any portion thereof, e.g. the grit, that contains starch. Certain farinaceous grain have been found to have the requisite degree of plasticity or become sufficiently thermoplastic during processing such that they can be molded into desired shapes, e.g. via injection molding.

In preferred embodiments, the farinaceous composition is a flour. In other preferred embodiments, the starchy farinaceous material is a whole grain, preferably a preprocessed whole grain. In yet other preferred embodiments, the starchy farinaceous material is prepared from a either the whole grain or a particulate portion of the grain, e.g. the grit, and has a particle size of from about 1 mm to about 3 mm. By comparison, flours generally have particle size ranges of about 50 to 80 microns.

The invention also relates to the expanded ("puffed") food product prepared from the expandable half-product upon exposure of the half-product to microwave radiation.

Another aspect of the present invention is directed to processes for manufacturing the expandable food products, e.g. half products. In a preferred embodiment, the process includes the steps of extruding a starchy farinaceous composition under sufficient temperature and pressure such that the starch molecules align in a unidirectional manner to form the expandable half-product. The extruder used can be any known in the art, e.g., a twin screw or single screw extruder, provided appropriate pressures can be achieved to produce the unidirectional alignment of the starch molecules.

A preferred process for preparing the expandable food products of the present invention utilizes an injection molding apparatus. When an injection molder is used, the process preferably includes the steps of extruding a starchy farinaceous material through a nozzle at a sufficient temperature and pressure such that the starch molecules in the starchy farinaceous achieve the unidirectional alignment. The starchy farinaceous material then passes through a runner portion of the mold into gates that lead to the shaped portion of the mold. The filled molds are preferably cooled, as the cooling step assists in maintaining the unidirectional alignment of the starch molecules when the expandable half product is removed from the mold.

The half-products, whether prepared by extrusion or injection molding, are then ready for consumer use, e.g. the consumer can expand the half-products by microwaving in a conventional microwave oven. Preferably, the expanded half-product is at least about twice the dimensions of the unmiicrowaved half-product, e.g. from about 2 to about 10 times the size of the unmicrowaved half-product.

DETAILED DESCRIPTION

The expandable half-products and the puffed products according to the present invention can be prepared in a variety of shapes with greater detail than prior art products. The expandable half-product can be further processed by the consumer into the final product, e.g. by exposing the product to microwave radiation in a conventional microwave oven.

The expandable half-products of the invention include a starchy farinaceous composition. A non-limiting list of suitable for inclusion in the ingredients starchy farinaceous composition include grains or products prepared from these farinaceous grains or deposited from rice, wheat, corn, oat, barley, and combinations thereof. Rice exhibits plastic-like qualities, presumably due to its high starch content, and is a preferred grain for use with the present invention.

The starchy farinaceous material can be a whole grain or a portion of the grain, e.g. the grit, a flour. The grain or portion thereof may be preprocessed, e.g. rotary cooked, bumped, or pregelatinized, as desired.

The starchy farinaceous material typically comprises from about 1 to about 100% by weight of the half-product or puffed product, and preferably from about 20 to about 95% by weight of the final product, i.e. half-product or puffed product, and more preferably from about 20 to about 50%. Other ingredients may be included in the starchy farinaceous material prior to preparing the expandable half-products. For example, sweetening agents may be added to provide flavor as well as texture. Suitable sweetening agents include those well known in the food industry, e.g. natural sweeteners such as sugars, and synthetic sweeteners such as aspartame or saccharine. Sucrose is a preferred sweetening agent. Generally, sweetening agents are included as about 1 to about 50% by weight of the half-product and preferably from about 1 to about 20% by weight.

Fruits or processed fruits, e.g. dried fruits, may also be included in the foodstuffs of the present invention. Preferred fruits include grapes, strawberries, and the like. Dried fruit products such as raisins are particularly preferred. When included, the processed fruit may comprise 1–50% by weight of the expandable half-product.

Other additives commonly used in the food industry may also be included in the starchy farinaceous composition. Such additives include flavorants, colorants, texturizing agents, preservatives, lubricants, and the like. Other processing aids that can be included in the compositions of the present invention will be readily apparent to those skilled in the art.

The water content of the starchy farinaceous composition is preferably in the range of from about 1 to about 40%, preferably from about 5 to about 20%, and more preferably from about 10 to about 18%. The water content apparently contributes to the thermoplasticity of the composition during the molding process. Optimum water content will vary with the particular ingredients used, e.g. from grain to grain, but the overall water content is preferably within the aforementioned ranges.

The water content can be adjusted as desired, and the inclusion of certain ingredients, e.g. oils, allow the starchy farinaceous material to be used at a lower water content than composition without the such ingredient(s). For example, if a vegetable oil is added to the starchy farinaceous composition, the water content can be reduced relative to the water content of the composition without the oil. Oil also has the added benefit of providing lubrication which assists in removing the half-products from the mold. When included, oil is preferably composition is included in amounts from about 1 to about 20% by weight of the starchy farinaceous composition. Suitable oils include any edible oils such as cottonseed oil, vegetable oils such as corn oil, and the like.

Preferably, the starchy farinaceous composition is pre-manufactured e.g. by forming pellets of the starchy farinaceous composition using an extruder, pregelatinization, or rotary cooking. The if flours are included in the starchy farinaceous composition, pellets containing the flour(s) are preferably formed. Pellets can be formed by, e.g., preparing and cooking a dough using a single screw extruder, and then transferring the cooked dough to a cold forming extruder and cutting the extrudate into the desired shape. The dough preferably has a moisture content of from about 20 to about 40% during the extrusion processes, and the resultant pellet is dried to achieve a moisture content of from about 1 to about 20, preferably from about 5 to about 15, and more preferably form about 10 to about 12 percent, by weight.

Alternatively, the grains are pre-processed by rotary cooking. The grain or grain product can be suitably prepared by cooking the grain in water in a rotary cooker for about 30 to about 90 minutes at a pressure of 10 to about 30 pounds per square inch (psi). Other types of cooking, steeping, can also be used.

The pre-processing step is not critical to the invention, provided that the resultant pre-processed ingredient has a water content of from about 5 to about 15%.

In preferred embodiments, the whole grain is used, preferably without any preprocessing.

Expandable half-food according to the present invention may be prepared as follows. The starchy farinaceous composition introduced into an extruder and extruded through a die at a sufficient pressure and temperature such that the starch molecules align in a unidirectional manner. The temperature should be sufficient to render the starches sufficiently thermoplastic for the extrusion process. Preferably, temperatures range from about 200 to about 400° F., and preferably between 250 and 300° F. The extrudate can then be cut with a chopper into the desired size. Conventional extruders can be used, provided the requisite die pressures are achieved. The food pressure in the die must ranges from about 3000 to about 5000 psi, and more preferably from about 4000 to about 4500 psi.

Alternatively, a the products can be prepared by injection molding. The injection molding apparatus preferably has a mold and an extruder portion. The mold preferably includes a runner, gates, and a shaped hollow portion. Preferably, the extruder portion has a screw feed having a screw and a cylinder wall, a heated chamber and nozzle. The screw feed is preferably heated to temperatures of from 100 to about 400° F., preferably from about 200 to about 300 ° F., to render the starches thermoplastic. The screw propels the farinaceous composition, which has attained a thermoplastic quality, down the length of the extruder portion of the apparatus to a pressurized chamber portion. The hydraulic pressure of the screw in the chamber portion is preferably from about 1500 psi to about 5000 psi, to achieve food pressures of approximately 10,000 to about 30,000 psi. It is also preferred that temperature of the chamber portion is the within the ranges cited for the screw feed portion of the apparatus, and is preferably the same temperature as the screw feed portion of the apparatus. The extrudate passes through the chamber into the nozzle into the mold via a hollow runner portion of the mold. The runner portion leads to gating areas that directly lead to the shaped portion of the mold. The gating areas are typically from about 1/6 to about 1/8 inches in diameter. The shaped portion areas of the mold are filled with the starchy farinaceous composition having unidirectionally aligned starch molecules. The filled mold is preferably cooled to maintain the unidirectional alignment of the starch molecules when the product is removed from the mold.

In a preferred embodiment, the screw provides a hydraulic pressure on the composition forcing the food through the nozzle.

Preferably, the food pressure in the nozzle of the injection molder is from about 5000 to about 30,000 psi, more preferably from about 8000 to about 25,000 psi, and most preferably from about 10,000 to about 20,000 psi.

During either process, the screw mechanically works the starchy farinaceous composition and propels it through the length of the extruder. Mechanical and shear forces break down the naturally occurring starch granules and/or long chain starches into shorter starch molecules that become unidirectionally aligned under conditions of sufficient temperature and pressure. The unidirectionally aligned matrix is a relatively weak structure and would naturally realign into a stronger matrix formation if not processed under the high-pressure conditions used in the process of the present invention.

The half-product is then further processed by the consumer to a desired end product by, e.g. microwaving the half-product to produce the expanded or "puffed" end product. The exposure to microwave radiation causes the starch molecules of the half-product to realign and form a matrix of randomly aligned starch molecules. The weak matrix structure of the unidirectionally aligned molecules contributes to the tremendous expansion exhibited by the half-products of the present invention. The puffed products generally have dimensions of from about 2 to about 10 times that of the microwaved half-product.

Farinaceous grains naturally contain starches in the form of granules. At the molecular level, the starch molecules in the granules can be described as a "ball of yarn", that is they are randomly aligned but in a rather compact arrangement. During processing in the extruder, the strch granules are destroyed and the individual starch molecules are free to realign. Due to the food pressures encountered in the extruder die, the starch molecules are forced to align in a compact formation, and tend to align in a unidirectional manner. It is hypothesized that a narrow gating diameter and high injection pressure contribute to the unidirectional alignment of the starch molecules. High mold pressures and rapid cooling maintain the unidirectional alignment of the starches in the molded product even after ejection from the mold. Water is trapped inside the products as well. Exposing the product to microwave radiation causes a rapid release of water from the product, and the water actually pulls on the starch molecules and realigns them in a random three-dimensional matrix. The realignment of the starch molecules into a three-dimensional matrix results in the expansion or "puffing" of the product. This explanation for discussion purposes only and is in no way intended to limit the scope of the present invention.

A suitable apparatus for use in accordance with the present invention is a single screw extruder with a ram die made by Cincinnati Milacron, Inc. model VSX 85 T-4.4402 IMM. The unit has three electrically heated barrel zones and an electrically heated nozzle. Machine controls ram displacement length and speed, screw rotation speed, injection ram pressure limit and time, pack time and ram pressure, hold time and ram pressure, die cooling time and ram pressure, which are optimized in accordance with the product used.

Other molding processes may also be used in accordance with the present invention, e.g. the processes according to the present invention can be used to produce an almost limitless variety of food products. For example, it is possible to mold multiple layers of product over one another. The layers may comprise the same ingredients or may be different materials. The final products may be solid or hollow. For example, a ready-to-eat cereal can be prepared having a marshmallow-based center with an overlayer of cereal grain.

The following non-limiting examples demonstrate preferred embodiments of the present invention.

DETAILED DESCRIPTION OF THE PREFERRED EMBODIMENTS

EXAMPLES 1–9

In Examples 1–9, various expandable half-products were prepared having using the following starchy farinaceous materials:

| EXAMPLES AND FORMULATION | | WATER CONTENT | | |
| --- | --- | --- | --- | --- |
| EXAMPLE | PRODUCT | LOWEST | MID | HIGHEST |
| 1 | Extruded Pellet combination | 14.35 | 16.80 | 19.98 |
| 2 | Rotary Cooked Corn | 13.91 | 17.23 | 18.82 |
| 3 | Rotary Cooked Rice | 13.41 | 15.51 | 18.80 |
| 4 | Extruded Corn | 13.65 | 16.82 | 20.00 |
| 5 | Extruded Cooked Rice | 14.90 | — | 17.90 |
| 6 | Extruded Rice | 13.65 | — | 17.76 |
| 7 | Extruded Wheat | 14.23 | 16.78 | 20.63 |
| 8 | Blend 50/50 | 13.41 | — | 14.23 |
| 9 | Blend 50/50 | 13.90 | — | 14.23 | composition of the extruded pellet combination of Example 1 is as follows:

| INGREDIENTS | % |
| --- | --- |
| Corn Flour | 42 |
| Wheat Flour | 31 |
| Oat Flour | 21 |
| Sugar | 4 |
| Salt | 2 |
| TOTAL | 100 |

Expandable products were prepared from the above starting farinaceous materials as follows. The materials were placed in the hopper of a single screw extruder with a ram die made by Cincinnati Milacron, Inc. model VSX 85 T-4.4402 IMM. The unit has three electrically heated barrel zones and an electrically heated nozzle. The barrel and chamber temperatures were set to between 200 to 310 ° F. The food pressures achieved in the nozzle were about 10,000 psi, which corresponded to hydraulic pressures of about 1700 psi.

The runner was either unheated or was heated to temperatures corresponding to the barrel temperature.

Machine controls ram displacement length and speed, screw rotation speed, injection ram pressure limit and time, pack time and ram pressure, hold time and ram pressure, die cooling tie and ram pressure, were optimized in accordance with the product used. Ram speed was set to 2 inches per second. The mold used was a pellet shape. After filling, the mold was cooled for 10 seconds at 60° F.

The resultant pellets were microwaved for about 20 seconds. All products expanded to from about 1.5 to about 10 times the unmicrowaved size of the half-product.

| EXAMPLES | PRODUCT | TEST |
| --- | --- | --- |
| 10 | Oat Base Pellets | 11.00% H$_2$O |
| 11 | Whole Wheat Pellets | 11.50% H$_2$O |
| 12 | Whole Wheat Pellets | 11.5% H2O (with 1% Oil Spray) |

EXAMPLES 13–15

In Examples 13–15, various pre-gelled and/or tempered grains are subjected to the injection molding process of Examples 1–9.

| EXAMPLES | PRODUCT | MOISTURE CONTENT(S) |
| --- | --- | --- |
| 13 | Pre-gelled Corn Pellets | 17% |
|  |  | 13% |
|  |  | 10% |
|  |  | 8% |
| 14 | Pre-gelled Wheat Pellets | 11% |
|  |  | 8% |
| 15 | Plant-Cooked Bumped & Tempered Rice | 11% |

Half-products were prepared using the ingredients of examples 13–15 in accordance with the method of Examples 1–9.

All of the products puffed when microwaved, and expanded form about 2 to about 7 times the unexpanded pellet.

EXAMPLES 16–25

In Examples 16–26, various pellet formulations were prepared and tested. The pellets were prepared by blending the dry ingredients and extruding through a twin screw extruder at a moisture content of from about 15–25% and cut into pellets of about ⅛". The pellets were dried to a moisture content of about 5 to about 15%. The pellets were then processed according to the method of Examples 1–9.

The composition of the blends is set forth in the Tables below:

EXAMPLE 16

| INGREDIENT | WT. % (dry base) |
| --- | --- |
| Wheat Corn Flour | 43.00 |
| Wheat Flour | 30.00 |
| Oat Flour | 20.00 |
| Sugar | 4.00 |
| Salt | 2.00 |
| Kaomel Oil | 0.75 |
| Dimodan | 0.25 |

EXAMPLE 17

| INGREDIENT | WT. % (dry base) |
| --- | --- |
| Corn Flour | 42.00 |
| Ultra-Crisp Food Starch | 24.75 |
| Oat Flour | 14.00 |
| Sugar | 8.00 |
| Kaomel Oil | 10.00 |
| Salt | 1.25 |

EXAMPLE 18

| INGREDIENT | WT. % (dry base) |
| --- | --- |
| White Corn Flour | 93.00 |
| Sugar | 4.00 |
| Salt | 2.00 |
| Kaomel Oil | 0.75 |
| Dimodan | 0.25 |

EXAMPLE 19

| INGREDIENT | WT. % (dry base) |
| --- | --- |
| Yellow Corn Flour | 43.00 |
| Ultra-Fine Wheat Bran | 30.00 |
| Wheat Flour | 10.00 |
| Oat Flour | 10.00 |
| Sugar | 4.00 |
| Salt | 2.00 |
| Kaomel Oil | 0.75 |

EXAMPLE 20

| INGREDIENTS | WEIGHT (lbs.) | % DB | % WATER |
| --- | --- | --- | --- |
| Corn Flour | 100.000 | 49.95 | 10.0 |
| 10x Powdered Sugar | 36.000 | 20.00 |  |
| Pre-Gelled Corn Flour | 40.000 | 20.00 | 10.0 |
| Kaomel | 14.400 | 8.00 |  |
| Flour Salt | 3.600 | 2.00 |  |
| Garlic (Kalsec) 41 gms | 0.090 | 0.05 |  |

EXAMPLE 21

| INGREDIENTS | WEIGHT (lbs.) | % DB | % WATER |
|---|---|---|---|
| White Wheat Flour | 100.000 | 49.95 | 10.0 |
| 10x Powered Sugar | 36.000 | 20.00 | |
| Pre-Gelled Wheat Flour (Pre-Gel 10) | 40.000 | 20.00 | 10.0 |
| Kaomel | 14.400 | 8.00 | |
| Flour Salt | 3.600 | 2.00 | |
| Garlic (Kalsec) 41 gms | 0.090 | 0.05 | |

EXAMPLE 22

| INGREDIENTS | WEIGHT (lbs.) | % DB | % WATER |
|---|---|---|---|
| Oat Flour | 100.000 | 49.95 | 10.0 |
| 10x Powdered Sugar | 36.000 | 20.00 | |
| Pre-Gelled Rice Flour | 46.000 | 23.00 | 10.0 |
| Kaomel | 9.000 | 5.00 | |
| Flour Salt | 3.600 | 2.00 | |
| Garlic (Kalsec) 41 gms | 0.090 | 0.05 | |

EXAMPLE 23

| INGREDIENTS | WEIGHT (lbs.) | WEIGHT (grams) | % Dry Base (DB) |
|---|---|---|---|
| Corn Flour | 193.3 | | 43.00 |
| Ultra Fine Grind (Wheat Bran) Gloria's | 133.3 | | 30.00 |
| Wheat Flour | 44.9 | | 10.00 |
| Oat Flour | 44.9 | | 10.00 |
| Sugar | 16.0 | | 4.00 |
| Salt | 8.0 | | 2.00 |
| Kaomel Oil | 3.0 | | 0.75 |
| Dimodan | 1.0 | 453.59 | 0.25 |

EXAMPLE 24

| INGREDIENTS | WEIGHT (lbs.) | WEIGHT (grams) | % DB |
|---|---|---|---|
| Corn Flour | 193.3 | | 43.00 |
| Wheat Flour | 134.8 | | 30.00 |
| Oat Flour | 89.9 | | 20.00 |
| Sugar | 16.0 | | 4.00 |
| Salt | 8.0 | | 2.00 |
| Kaomel Oil | 3.0 | | 0.75 |
| Dimodan | 1.0 | 453.59 | 0.25 |

EXAMPLE 25

| INGREDIENTS | WEIGHT (lbs.) | WEIGHT (grams) | % DB |
|---|---|---|---|
| White Corn Flour | 193.3 | | 43.00 |
| Wheat Flour | 134.8 | | 30.00 |
| Oat Flour | 89.9 | | 20.00 |
| Sugar | 16.0 | | 4.00 |
| Salt | 8.0 | | 2.00 |
| Kaomel Oil | 3.0 | | 0.75 |
| Dimodan | 1.0 | 453.59 | 0.25 |

EXAMPLE 26

| INGREDIENTS | WEIGHT (lbs.) | WEIGHT (grams) | % DB |
|---|---|---|---|
| White Corn Flour | 418.0 | | 93.00 |
| Sugar | 16.0 | | 4.00 |
| Salt | 8.0 | | 2.00 |
| Kaomel Oil | 3.0 | | 0.75 |
| Dimodan | 1.0 | 453.59 | 0.25 |

All of the products puffed from about 2 to about 10 times the size of the half-product when microwaved.

Further variations will be apparent to those skilled in the art without departing from the spirit and scope of the claims appended hereto.

What is claimed is:

1. A process for preparing an expandable food product comprising:
    directly injecting a composition comprising an edible starchy farinaceous material into a mold at a pressure of from 10,000 to about 30,000 psi with an injection molder, and
    cooling the molded composition to form the molded expandable food product.

2. The process of claim 1, wherein said starchy farinaceous material is at least one member selected from the group consisting of corn, wheat, rice, barley, and oats.

3. The proces of claim 2, further comprising cooking said farinaceous grain prior to the injection molding step.

4. The process of claim 1, wherein the expandable food product comprises from about 0 to about 10% of an oil.

5. The process of claim 4, wherein said starchy farinaceous material is at least one member selected from the group consisting of corn, wheat, rice, barley, and oats.

6. The process of claim 5, further comprising cooking said farinaceous grain prior to the injection step.

7. The process of claim 4, further comprising cooking said farinaceous grain prior to the injection molding step.

8. The process of claim 1, further comprising cooking said farinaceous grain prior to the injection molding step.

9. The product produced by the process of claim 1.

10. A process for preparing an expandable food product comprising the steps of:
    directly injecting an edible composition comprising from at least 50% by wt. of a starchy farinaceous material and from about 0 to about 50% by weight of a sweetening agent into a mold at a pressure of from 10,000 to about 30,000 psi the temperature of the composition being from 200 to 400° F. during injection; and
    cooling the mold to cool the molded composition thereby forming the expandable food product.

11. The process of claim 10, wherein said starchy farinaceous material is selected from the group consisting of corn, wheat, rice, barley, oats, grits thereof, and mixtures thereof.

12. The process of claim 11, further comprising cooking the starchy farinaceous material prior to the injection step.

13. The process of claim 11, further comprising preparing the farinaceous grain to have a water content of from about 1 to about 20% prior to the molding process.

14. The product produced by the process of claim 10.

15. A process for preparing an expandable food product consisting essentially of:

preparing a feed pellet by extruding an edible composition comprising a starchy farinaceous material in a cooker extruder to gelatinize the starch and cutting the extruded material into feed pellets; and drying said feed pellets to a moisture content of from 1 to 20% by weight; and feeding said feed pellets into an injection molder and injecting the material into a mold at a pressure of from 10,000 to 30,000 psi to form an expandable food product.

16. The product produced by the process of claim 15.

17. A process for preparing an expandable food product consisting essentially of:

directly injecting a composition comprising an edible starchy farinaceous material into a mold at a pressure of from 10,000 to about 30,000 psi with an injection molder; and cooling the molded composition to form the molded expandable food product.

18. The product produced by the process of claim 17.

19. A process for preparing an expandable food product consisting of:

directly injecting a composition comprising an edible starchy farinaceous material into a mold at a pressure of from 10,000 to about 30,000 psi with an injection molder; and cooling the molded composition to form the molded expandable food product.

20. The product produced by the process of claim 19.

* * * * *